United States Patent
Lin et al.

(10) Patent No.: US 9,048,585 B2
(45) Date of Patent: Jun. 2, 2015

(54) ELECTRICAL CONNECTOR HAVING A ROTATABLE BUCKLE

(71) Applicant: HON HAI PRECISION INDUSTRY CO., LTD., New Taipei (TW)

(72) Inventors: Yuan-Chieh Lin, Lake Forest, CA (US); Jun-Bin Huang, Eastvalke, CA (US); Gang Paul Chen, Walnut, CA (US); Wei Nong Chou, La Puente, CA (US); Terrance F. Little, Fullerton, CA (US); Jie Zheng, Rowland-Heights, CA (US); An-Jen Yang, Irvine, CA (US); Jim Zhao, Irvine, CA (US)

(73) Assignee: FOXCONN INTERCONNECT TECHNOLOGY LIMITED, Grand Cayman (KY)

( * ) Notice: Subject to any disclaimer, the term of this patent is extended or adjusted under 35 U.S.C. 154(b) by 29 days.

(21) Appl. No.: 14/072,800

(22) Filed: Nov. 6, 2013

(65) Prior Publication Data

US 2015/0126065 A1  May 7, 2015

(51) Int. Cl.
*H01R 13/648* (2006.01)
*H01R 12/50* (2011.01)

(52) U.S. Cl.
CPC ............ *H01R 13/648* (2013.01); *H01R 23/684* (2013.01)

(58) Field of Classification Search
CPC ..................................................... H01R 23/684
USPC .......................... 439/331, 342, 345, 367, 372
See application file for complete search history.

(56) References Cited

U.S. PATENT DOCUMENTS

| 6,178,096 | B1 * | 1/2001 | Flickinger et al. ............ 361/816 |
| 6,439,918 | B1 * | 8/2002 | Togami et al. ................ 439/372 |
| 6,926,551 | B1 | 8/2005 | Schulz |
| 7,210,952 | B2 * | 5/2007 | Ishida ........................... 439/331 |
| 7,329,054 | B1 | 2/2008 | Epitaux |
| 7,401,985 | B2 | 7/2008 | Aronson |
| 7,848,375 | B1 | 12/2010 | Thiyagarajan |
| 7,955,003 | B2 | 6/2011 | Teo |
| 8,100,588 | B2 | 1/2012 | Wong |
| 8,360,794 | B2 * | 1/2013 | Chien et al. .................... 439/331 |
| 8,414,309 | B2 | 4/2013 | Meadowcroft |
| 8,500,477 | B2 * | 8/2013 | Yeh ................................ 439/342 |
| 8,506,316 | B2 * | 8/2013 | Tsai et al. ...................... 439/331 |
| 8,808,021 | B2 * | 8/2014 | Liu et al. ....................... 439/331 |
| 2007/0212933 | A1 * | 9/2007 | Kondou et al. ............ 439/541.5 |
| 2012/0243833 | A1 | 9/2012 | Shimotsu |

* cited by examiner

*Primary Examiner* — Chandrika Prasad
(74) *Attorney, Agent, or Firm* — Wei Te Chung; Ming Chieh Chang (57) ABSTRACT

An electrical connector assembly (600) comprising a shielding housing (20) and a socket (40), and a buckle (60) assembled to the shielding housing. The shielding housing has a horizontal passage (22) and an entrance (220) backwardly communicating the passage and forwardly opening for receiving a plug (80). The socket is used for mating with a front end of a plug inserted therein. The buckle has a front latch (62) movable between an open position where a plug inside the shielding housing is permitted to be pulled out and a closed position where the front latch blocks the entrance of the shielding housing so that a plug inside the shielding housing is blocked from being pulled out.

15 Claims, 8 Drawing Sheets

ELECTRICAL CONNECTOR HAVING A ROTATABLE BUCKLE

BACKGROUND OF THE INVENTION

1. Field of the Invention

The present invention relates generally to electronic connector systems and, more specifically, to low-profile connector systems for pluggable electronic modules, such as transceiver modules for high speed fiber optical and copper communications.

2. Description of Related Art

U.S. Patent Application Publication No. 2012/0243833 discloses a connector assembly including a connector housing provided with optical connection portion and optical semiconductor device for positioning and coupling a plug and a lock member rotatably connected to the connector housing for latching to the housing so that at a closed position the plug can be stably maintained. U.S. Pat. No. 8,414,309 discloses an optical communication system including a transceiver module, a protective socket receiving the module, an optical connector connected to a top portion of the module, and a clip mechanically coupled to the socket over the optical connector. The transceiver module includes an optical subassembly (OSA), an electrical subassembly (ESA) coupled to the OSA, and a circuit board secured to a bottom of the ESA. When the transceiver module is seated within the protective socket, electrical contacts located on the bottom face of the circuit board are in contact with respective contacts located on the socket.

SUMMARY OF THE INVENTION

Accordingly, an object of the present invention is to provide an electronic connector system having a connector assembly and a mating plug with a simplified latch release mechanism.

Another object of the present invention is to provide an electrical connector assembly having a connector assembly and a mating plug with less insertion force when the plug is inserted into the connector assembly.

According to the present invention, the electrical connector assembly adapted to be mounted onto a horizontal mother board comprises a shielding housing and a socket adapted to be mounted onto the mother board, and a buckle assembled to the shielding housing. The shielding housing has a horizontal passage and an entrance backwardly communicating the passage and forwardly opening for receiving a plug. The socket is used for mating with a front end of a plug inserted therein. The buckle has a front latch movable between an open position permitting a plug outside of the shielding housing to be inserted into the passage and a plug inside the shielding housing to be pulled out therefrom and a close position where the front latch blocks the entrance of the shielding housing so that a plug outside of the shielding housing is blocked from being inserted into the shielding housing and a plug inside the shielding housing is blocked from being pulled out therefrom.

According to the present invention, another electrical connector assembly is also provided comprising a shielding housing and a socket adapted to be mounted onto a mother board, a plug adapted to be inserted into the shielding housing, and a buckle assembled to the shielding housing. The shielding housing has a horizontal passage and an entrance backwardly communicating the passage and forwardly opening. The socket is mounted behind the passage aligned to the passage to receive the plug when the plug is inserted the entrance into the passage. The plug has a front end for making a mechanical and electrical connection with the socket. The buckle has a presser movable related to the shielding housing between an off position where, when the plug is inserted into the passage of the shielding housing, the front end is first kept off from the socket, and a work position where the presser then downwardly presses the front end of the plug to make said mechanical and electrical connection.

Other objects, advantages and novel features of the invention will become more apparent from the following detailed description when taken in conjunction with the accompanying drawings.

DETAILED DESCRIPTION OF THE PREFERRED EMBODIMENT

Reference will now be made in detail to the preferred embodiment of the present invention.

Referring FIGS. 1-8, an electrical connector assembly 600 adapted to be mounted onto a horizontal mother board (not shown) comprising a shielding housing 20 adapted to be mounted along an edge of the mother board, a plurality of sockets 40 adapted to be mounted behind the shielding housing 20, a buckle 60 fixed to the shielding housing 20 and a plug 80 adapted to be inserted into the shielding housing.

The shielding housing 20 is a metal die-casting component for organizing the buckle 60 and the plug 80. The shielding housing 20 defines a plurality of horizontal passages 22 and a plurality of entrances 220 each backwardly communicating corresponding passage 22 and forwardly opening for receiving a plug 80. Each of the passages 22 has an upper opening 222 and a lower opening 224. The shielding housing 20 is equipped with a horizontally and transversely extending shaft 226 to fix the buckle 60 rotatably between a work position and an off position.

Figure 5:
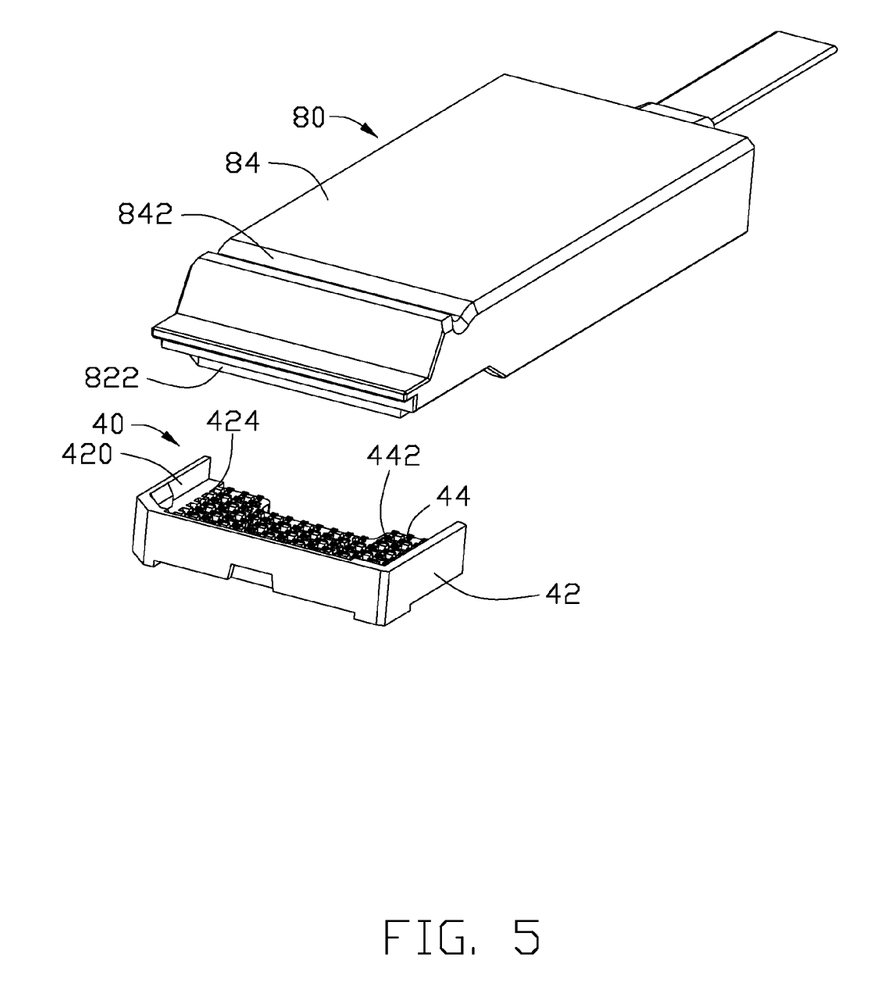
FIG. 5 is a view of the plug and the socket.
Figure 6:
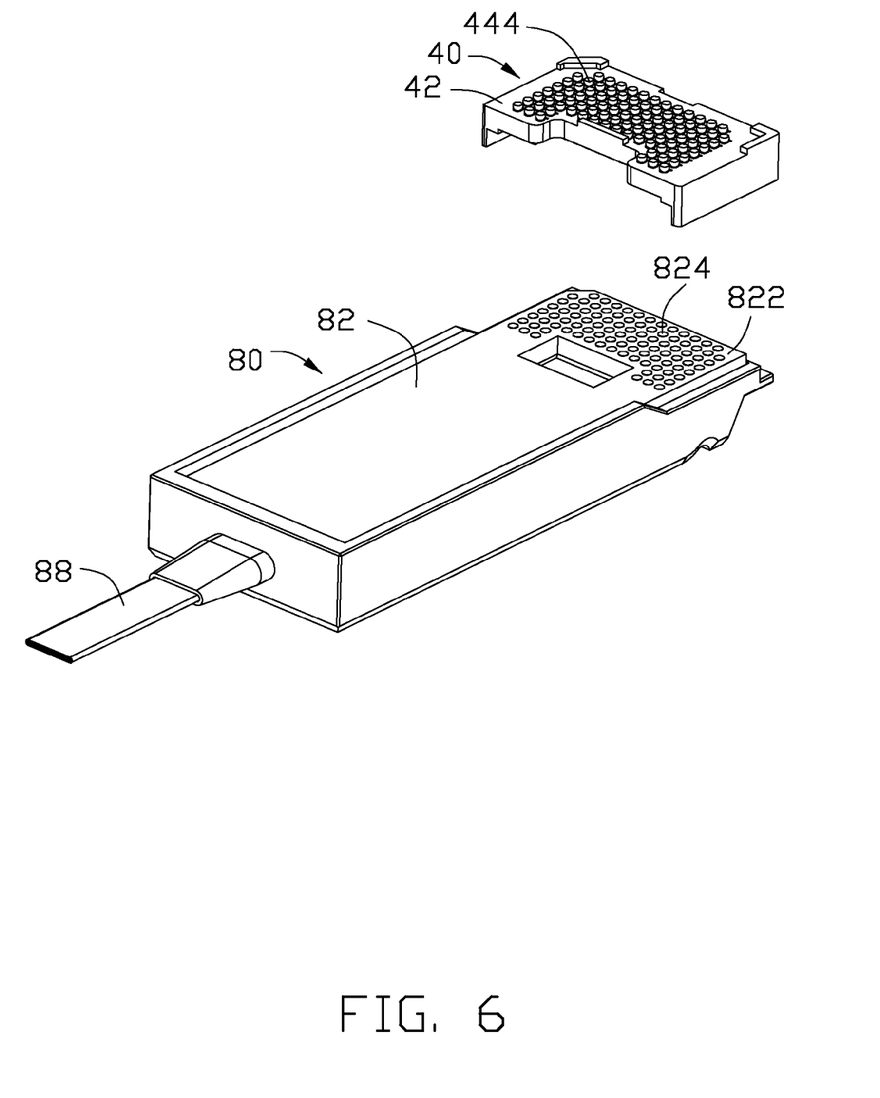
FIG. 6 is a view similar to FIG. 5 but from a different view point.

Each of the sockets 40 is adapted to be mounted on the mother board behind corresponding one of the passages 22 and received in the lower opening 224. The socket 40 is a type of LGA (land grid array) connector having an insulating housing 42 and an array of contacts 44 fixed therein. Each of the contacts 44 has a contact portion 442 for upwardly mating with the plug 80 inserted therein and a footer portion 444 for being downwardly mounted onto the mother board. The insulating housing 40 defines a receiving cavity 420 opening upwardly and forwardly for receiving a front end of the plug 80. The insulating housing defines an upward face 424, the contact portion 442 of each contacts 44 upwardly exposed above the upward face 424.

Figure 1:
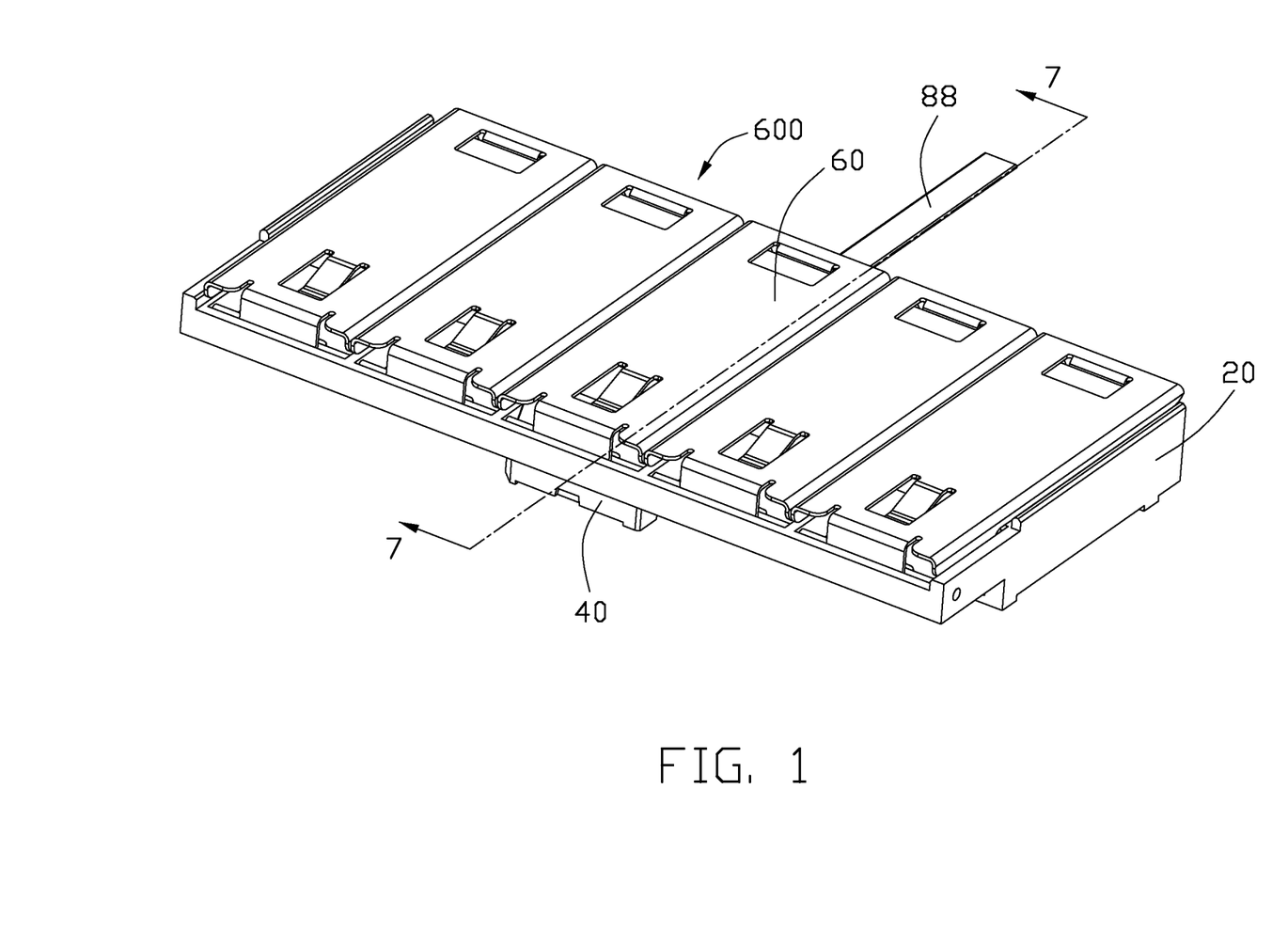
FIG. 1 is a perspective view of an electrical connector system of high speed optical and copper communications.
Figure 2:
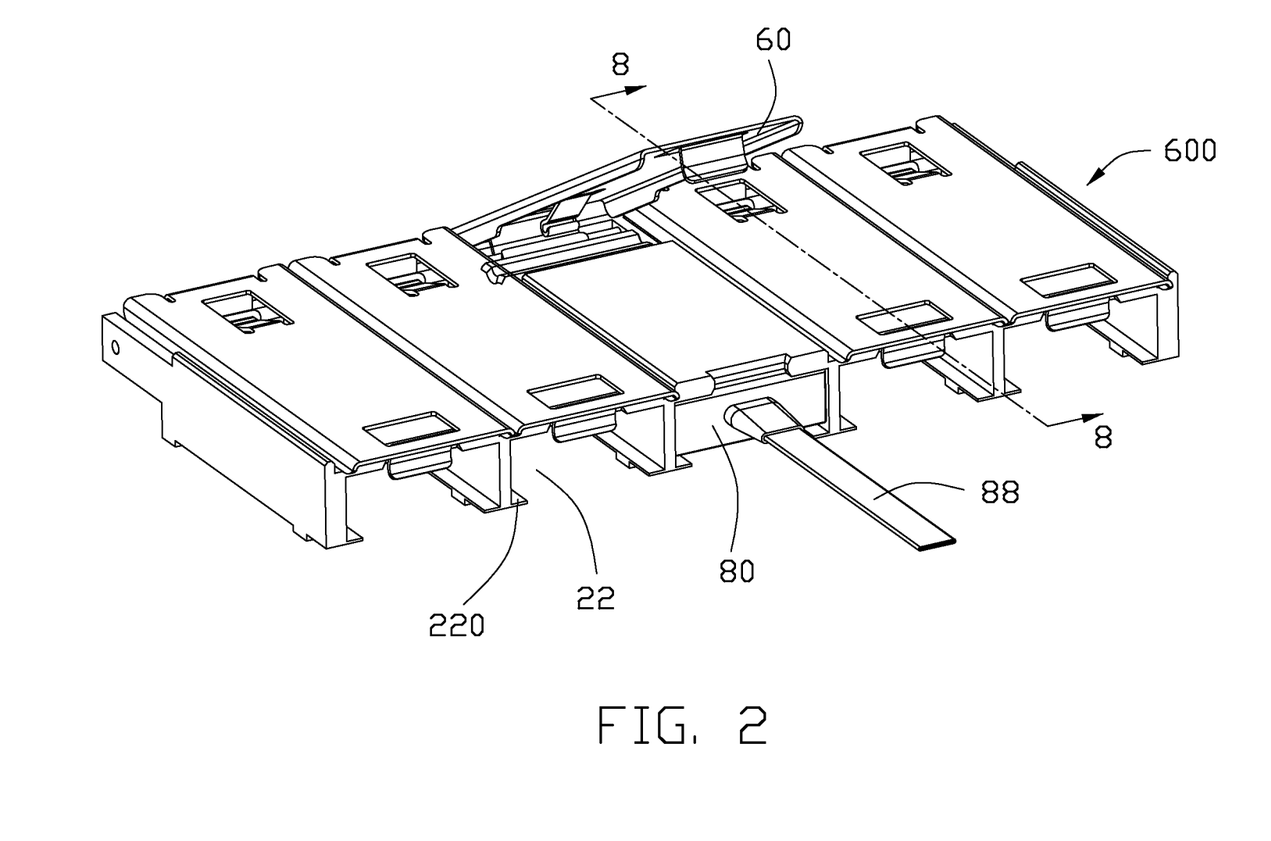
FIG. 2 is a perspective view of the electrical connector system shown in FIG. 1 but from a different view point and with a buckle thereof being operated to an open position.
Figure 3:
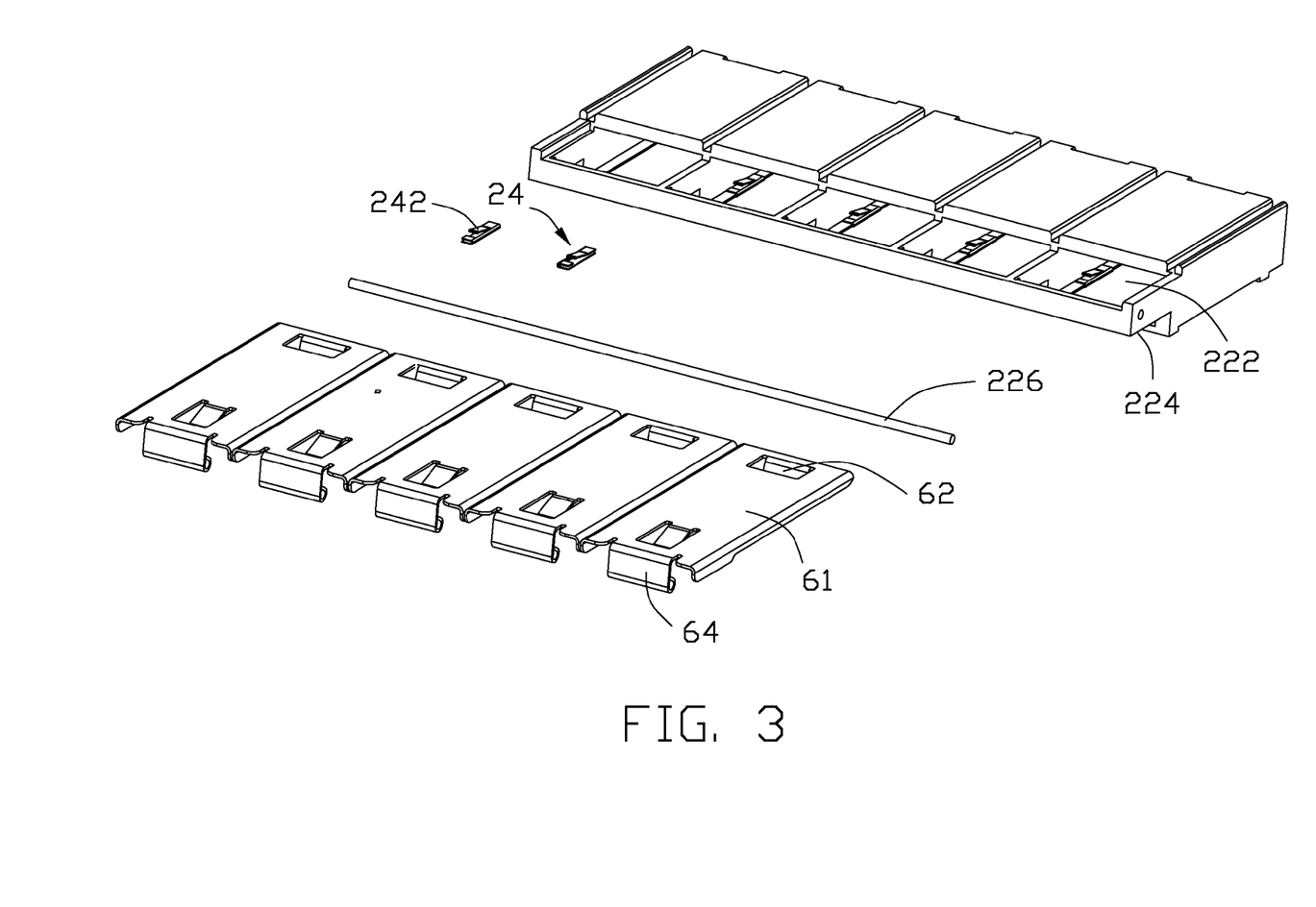
FIG. 3 is a partially exploded view of the electrical connector system with sockets and plugs removed.
Figure 4:
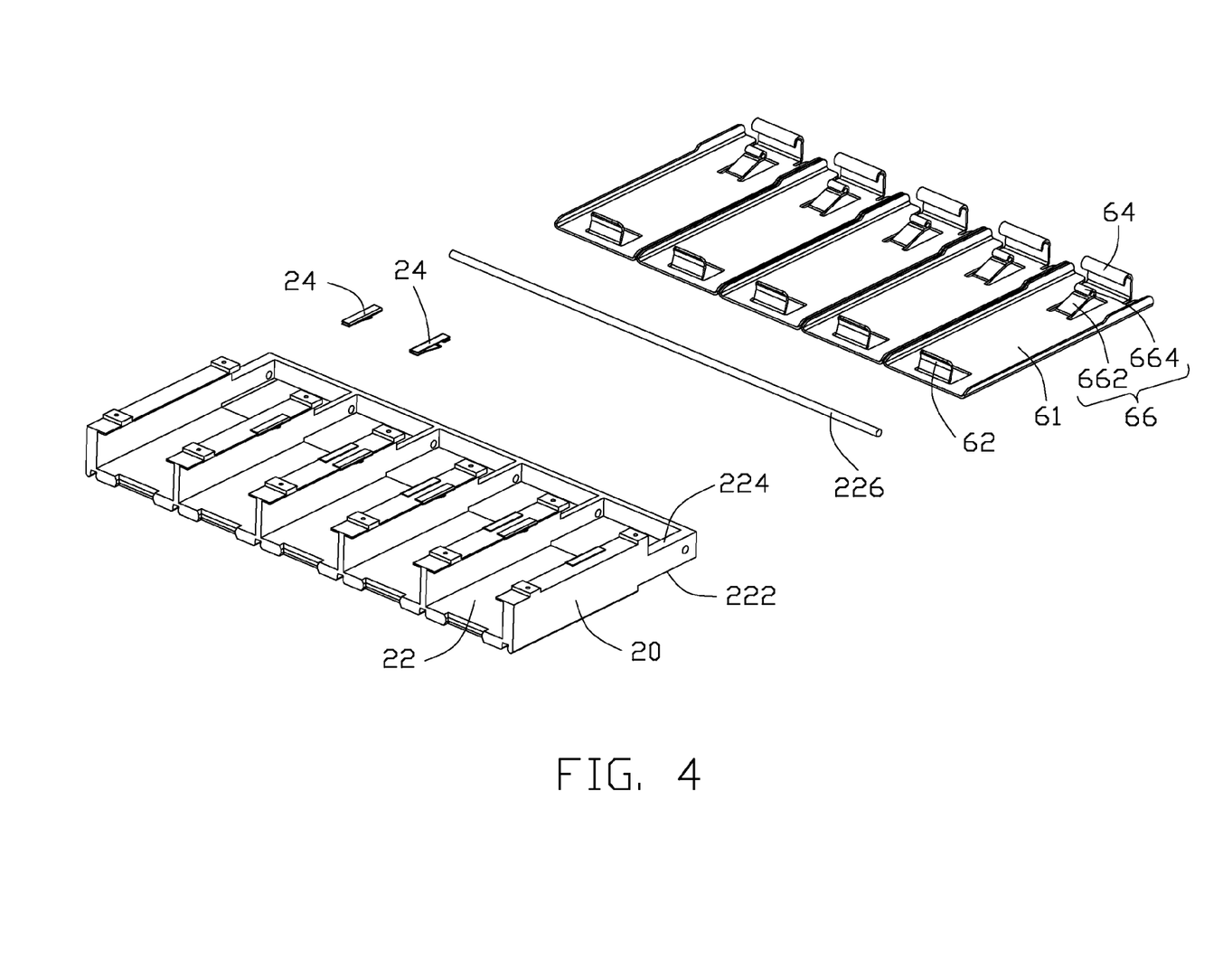
FIG. 4 is a view similar to FIG. 3 but from a different view point.

The buckle 60 is stumped from a metal sheet and has a board portion 61, a front latch 62 downwardly extending from a front end of the board portion 61, a rear hook 64 downwardly extending from a rear end of the board portion 61 and fixed to the shaft 226, and a rear presser 66 disposed before the rear hook 64. The presser 66 of the buckle 60 has a deflectable arm 662 extending rearwardly and downwardly from the board portion and an arc end 664. The arc end 664 is adapted to be received in the top slot 842 of the metal cover 84 and press the front end of the plug 80. When a plug 80 is inserted into one passage 22 of the shielding housing 20, and the buckle 60 is operated to the work position where the buckle 60 is closed to the shielding housing 20, the front latch 62 extends into the passage 22 thereby preventing the plug from (piling therefrom, and the rear presser 66 downwardly drives the front end of the plug 80 to mate with the socket 40. When the plug 80 is not inside the shielding housing 20, and the buckle 60 is closed to the shielding housing 20, the front latch 62 blocks insertion of the plug 80 into one passage 22 of the shielding housing 20. When the plug were needed to be inserted into the passage 22 of the shielding housing 20 or withdrawn therefrom, the buckle 60 is operated to the off position where the buckle 60 is rotated around the shaft 226 with a front end opened from the shielding housing 20, so that the front latch 62 quit from the passage 22 thereby permitting insertion of the plug 80 thereinto or withdrawing the plug 80 therefrom.

Figure 7:
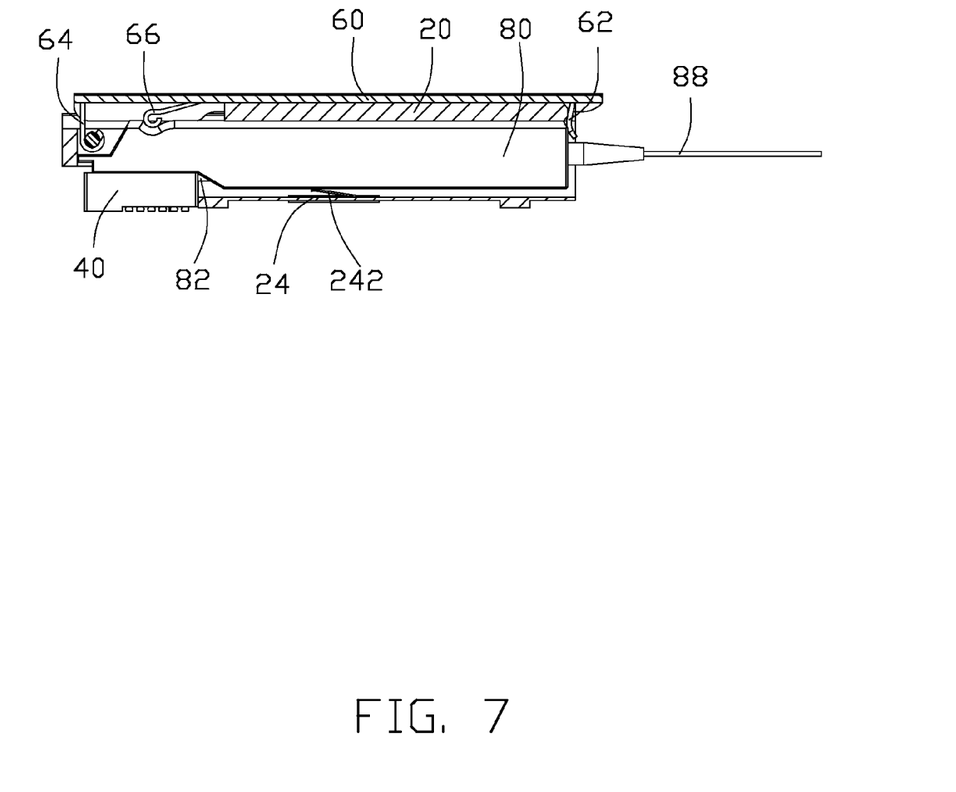
FIG. 7 is a cross-sectional view along line 7-7 in FIG. 1.
Figure 8:
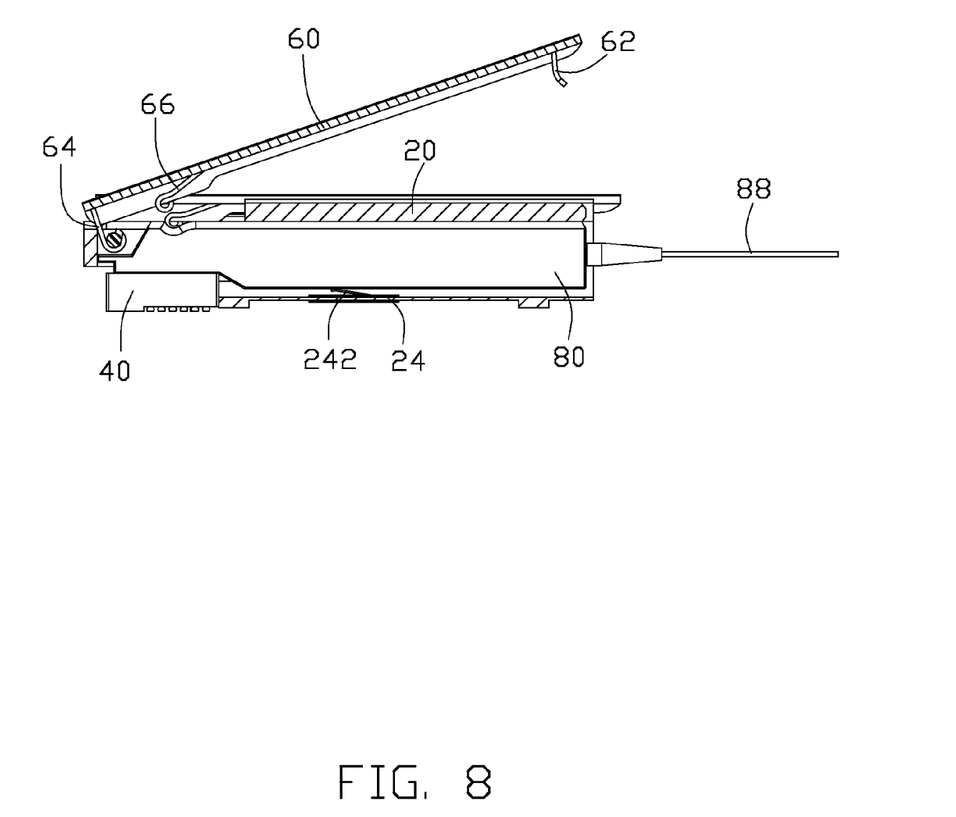
FIG. 8 is a cross-sectional view along line 8-8 in FIG. 2.

The plug 80 is an AOC (active optical cable) plug equipped polymer optical waveguide 88 and a daughter card 82 loaded with opt-electrical components (not shown). The daughter card 82 has a front edge 822 having a plurality of conductive lands or conductors 824 for mating with the contacts 44 of the socket 40 thus forming an electrical interface therebetween. As shown in FIGS. 5, 7 and 8, the plug 80 includes a metal cover 84 receiving the daughter card 82. The metal cover 84 defines a top slot 842 to receive the arc end 664 of the rear presser 66 of the buckle 60.

As shown in FIGS. 7 and 8, the shielding housing 20 is further equipped with a spring pusher 24 for lifting the front end of the plug 80 so that the front end of the plug 80, especially the conductive lands 824 of the daughter cards 82, does not mate with the contacts 44 of the socket 40 when the plug is first fully inserted into the socket 40 and the buckle 60 is positioned at the open position. During this operation, since the contacts 44 of the socket 40 do not mate the daughter cards 82, thus no friction between the contacts 44 and the plug 80 needed to be overcome, a lower insertion force to insert the plug 80 backwardly can be achieved. The spring pusher 24 is a flexible metal piece defining a guiding face 242 extending from a bottom side of the passage 22 slantwise in a rearward and upward direction. When the buckle 60 is moved from the open position to the closed position, the presser 66 of the buckle 60 gives a downward and rearward force to the plug 60 which overcomes the lifting force of the spring pusher 24 applied to the front end of the plug 80 and drives the front end of the plug 80 to move a little distance downwardly and rearwardly, so that the conductive lands 824 of the daughter card 82 are brought to contact the contacts 44 of the socket 40 with little or no scratch therebetween. When the buckle 60 is opened from the closed position to the open position, the presser 66 of the buckle 60 releases the front end of the plug 80 and an outward force is applied to the plug 80.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. An electrical connector assembly adapted to be mounted onto a horizontal mother board, comprising:
   a shielding housing adapted to be mounted onto the mother board, the shielding housing having a horizontal passage and an entrance backwardly communicating the passage and forwardly opening for receiving a plug;
   a socket adapted to be mounted behind the passage for mating with a front end of a plug inserted therein; and
   a rotatable buckle having a front latch movable between an open position permitting a plug outside of the shielding housing to be inserted into the passage and a plug inside the shielding housing to be pulled out therefrom and a closed position where the front latch blocks the entrance of the shielding housing so that a plug outside of the shielding housing is blocked from being inserted into the shielding housing and a plug inside the shielding housing is blocked from being pulled out therefrom.

2. The electrical connector assembly claimed in claim 1, wherein the buckle has a rear end rotatably mounted to the shielding housing about an axis parallel to a horizontally transverse direction and a front end equipped with the front latch.

3. The electrical connector assembly claimed in claim 2, wherein the shielding housing is equipped with a spring pusher for lifting the front end of the plug so that the front end of the plug unmates with the socket when the plug is first fully inserted into the socket and the buckle is positioned at the open position.

4. The electrical connector assembly claimed in claim 3, wherein the buckle forms a rear presser for downwardly driving the front end of the plug to mate the socket when the buckle is operated to the closed position.

5. The electrical connector assembly claimed in claim 4, wherein the buckle has a deflectable arm extending rearwardly and downwardly, the rear presser formed at a free end of the deflectable arm.

6. The electrical connector assembly claimed in claim 3, wherein the spring pusher is a flexible metal piece defining a guiding face extending from a bottom side of the passage slantwise in a rearward and upward direction.

7. The electrical connector assembly claimed in claim 1, wherein the socket has a plurality of contacts each having a contact portion for upwardly mating with a plug inserted therein and a footer portion for being downwardly mounted onto the mother board.

8. An electrical connector system adapted to be mounted onto a horizontal mother board, comprising:
   a shielding housing adapted to be mounted onto the mother board, the housing having a horizontal passage and an entrance backwardly communicating the passage and forwardly opening to an exterior;
   a socket adapted to be mounted behind the passage,
   a plug adapted to be inserted through the entrance into the passage and having a front end for making a mechanical and electrical connection with the socket; and
   a buckle having a presser movable relative to the shielding housing between an off position where, when the plug is inserted into the passage of the shielding housing, the front end is first kept off from the socket and a work position where the presser then downwardly presses the front end of the plug to make said mechanical and electrical connection.

9. An electrical connector system claimed in claim 8, wherein the buckle has a rear end rotatably fixed to the shielding housing about an axis parallel to a horizontally transverse direction and a front end equipped with a front latch to block the entrance when the buckle is rotated to the work position, the front latch leaving the entrance when the buckle is rotated to the off position.

10. The electrical connector system claimed in claim 9, wherein the shielding housing has a spring pusher for lifting the front end of the plug so that the front end of the plug unmates the socket when the plug is first fully inserted into the socket.

11. The electrical connector system claimed in claim 10, wherein the presser of the buckle has a deflectable arm extending rearwardly and downwardly and an arc portion at a free end of the deflectable arm.

12. The electrical connector system claimed in claim 11, wherein the spring pusher is a flexible metal piece having a guiding face rearwardly and upwardly extending from a bottom side of the passage.

13. The electrical connector system claimed in claim 12 wherein the socket has a plurality of contacts each having a contact portion for upwardly mating with a plug inserted therein and a footer portion for being downwardly mounted onto the mother board.

14. The electrical connector system claimed in claim 13, wherein the socket has an insulating housing defining a cavity opening upwardly and forwardly and an upward face in the cavity, the contact portion of each contact exposed above the upward face.

15. The electrical connector system claimed in claim 8, wherein the plug defines an upward slot positioning the presser of the buckle when the plug is inserted into the shielding housing and the buckle is operated to the work position.

* * * * *